3,122,525
PRODUCTION OF POLYOXYMETHYLENES
Werner Kern and Volker Jaacks, Mainz (Rhine), Germany, assignors to Deutsche Gold- und Silber-Scheideanstalt vormals Roessler, Frankfurt am Main, Germany
No Drawing. Filed May 11, 1961, Ser. No. 109,279
Claims priority, application Germany May 12, 1960
5 Claims. (Cl. 260—67)

The present invention relates to an improved process for the production of polyoxymethylenes.

The increasing technical significance of polyoxymethylenes had led to a large number of publications and proposals concerning their production, such as, for example, U.S. Patent Nos. 2,844,561 and 2,848,437. The majority of the processes which have become known use monomeric formaldehyde as the starting material which is polymerizable under anhydrous conditions with a wide variety of catalysts.

Only very few processes were previously known for the polymerization of the cyclic trimeric formaldehyde, trioxane, to produce macromolecular polyoxymethylenes. The use of trioxane offers a number of advantages over monomeric formaldehyde which technically simplify the process. Whereas anhydrous formaldehyde only remains unchanged for a very short time even at low temperatures because of spontaneous polymerization, trioxane can be stored for an unlimited amount of time and is easily transported. Both the polymerization of formaldehyde and of trioxane should be carried out with as complete an exclusion of water as possible. While the dehydration and purification of formaldehyde can only be achieved with difficulty and high expense, the removal of water from trioxane can be effected in a simple manner by azeotropic distillation.

Previously only strong Lewis acids, especially inorganic fluorides, such as hydrofluoric acid, aluminum trifluoride, titanium tetrafluoride, zinc fluoride, antimony fluoride (see U.S. Patent No. 2,795,571) and boron fluoride, were known as initiators for the polymerization of trioxane. These catalysts, however, have the great disadvantage that they are firmly bound on the polyoxymethylenes produced, probably by a complex bond, and can only be removed therefrom by reprecipitation from dimethyl formamide or by treatment at raised temperatures with alkalies. These measures, however, lead to destruction of a portion of the polymers. If, on the other hand, such catalysts are not removed they catalyze depolymerization of the polyoxymethylene to monomeric formaldehyde during subsequent hot molding or other treatments in which the polyoxymethylene is subjected to higher temperatures. As such inorganic fluorides are used in relatively high concentrations (up to 2%), the depolymerization of the polyoxymethylenes produced at elevated temperatures is very rapid. For example, if a polyoxymethylene produced with 1% of antimony trifluoride from melted trioxane at 130° C. is heated to 180° C. it depolymerizes so rapidly that it is quantitatively decomposed in 60 minutes.

Similar disadvantages are encountered when inorganic chlorides, such as aluminum trichloride, zinc chloride and antimony pentachloride, which in themselves have good catalyzing action, are used.

According to the invention it was found that organic perchloric acid compounds can be used with good success for polymerization of water free trioxane. Of this class of compounds, the mixed anhydrides of perchloric acid and carboxylic acids, as well as esters of perchloric acid with mono- or polyhydric alcohols, such as, for example, acetyl perchlorate, benzoyl perchlorate, tert. butyl perchlorate, have proved particularly suited. Esters of perchloric acid and the mixed anhydrides of perchloric acid with carboxylic acids, respectively, are of the following general formulae

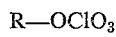
and
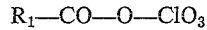

wherein R and $R_1$ are the radicals derived from the alcohol and carboxylic acid employed for the esterification or the formation of the mixed anhydrides with the perchloric acid.

The initiators according to the invention can be added as such but more espediently as a mixture of equivalent compounds from which such initiators are produced under the conditions of the polymerization. Advantageously, mixtures of salts of perchloric acid and organic compounds, preferably with a reactive halogen, can be employed. Expediently, the components are so selected that a salt of only a slight degree of dissociation is produced from the reactive halogen and the metal component of the perchloric acid salt (for example, tertiary butyl chloride and silver perchlorate).

The initiators employed according to the invention catalyze the cationic polymerization of water free monomeric formaldehyde equally as well. Such cationic polymerization possesses a number of advantages over the normal anionic polymerization, for example, cationic transfer agents and/or copolymerizable materials, can be incorporated in the polymer during the polymerization.

The initiators according to the invention have the following advantages over those previously known:

Only very small quantities of initiator are required for the rapid and quantitative polymerization (for example, up to 5 mols of trioxane or formaldehyde can be polymerized in water free nitrobenzene by $10^{-5}$ mols of acetyl perchlorate.

The residues of unused catalyst can easily be removed from the polyoxy methylene produced by washing it out with water.

The polymers produced possess good thermal stability. This stability is traceable to the very high molecular weight of the products and to the special type of the end groups which are incorporated in the polyoxymethylenes from the initiators employed and the substances empolyed for termination of the chain growth.

The polymerization when using tertiary butyl perchlorate as the catalyst probably begins in the following manner:

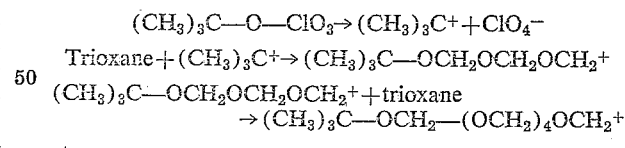

etc.

The tertiary butyl end groups which are built into the polyoxymethylene are, as is known, chemically and thermally stable.

It is also possible to introduce stable end groups in the polymer by substances employed to terminate the chain growth. For example, the presence of methoxy end groups in the polyoxymethylenes can be determined analytically when the polymerization thereof has been terminated by the addition of water free methanol:

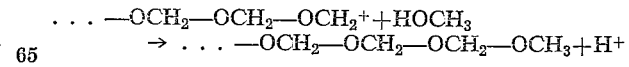

The presence of water during the polymerization similarly causes limitation of chain growth. As OH end groups of low stability are obtained, the thermal stability of the polyoxymethylene produced is especially dependent upon the water content of the trioxane which is polymerized. Even at a low water content of 0.1% a noticeable polymerization transfer occurs whereby polyoxymethylenes of low molecular weight and with the unstable OH end groups are produced. As a consequence, the trioxane employed must contain less than 1% of water and preferably less than 0.1% of water.

The polymerization of trioxane employing the initiators according to the invention can be carried out with melted trioxane or preferably in inert water free organic solvents, such as nitrobenzene, toluene, benzene, heptane, cyclohexane, ethylene chloride and the like, while stirring. When the polymerization is carried out in solution, the polyoxymethylene is produced in the form of a fine easily filtered powder. The concentration of the trioxane can be as desired but for economic reasons the lower limit is about 5% and the upper about 50% as at higher concentrations the polymer produced solidifies in the solvent.

Monomeric formaldehyde can be polymerized by known procedures in which the gaseous formaldehyde, if desired diluted with an inert gas, is polymerized by being passed into an inert solvent containing the initiator.

Depending upon the purity of the trioxane or formaldehyde employed, 1–1000 mg. of the initiators according to the invention are employed per kilogram of the trioxane or formaldehyde. The initiators are added to the trioxane solution as a solution or suspension, preferably dilute, in an inert solvent such as toluene or nitrobenzene with vigorous stirring.

The temperature employed only affects the velocity of the polymerization. Temperatures between about 0 and 100° C. can, for example, be selected for the polymerization employing the initiators according to the invention.

The polymerization can, when the desired conversion has been attained, be terminated by the addition of a few percent by weight of anhydrous methanol. The polymer can then be filtered off and well washed with water containing a small quantity of sodium carbonate.

The initiators according to the invention are suited for the copolymerization of trioxane as well as for its homopolymerization. For example, the copolymerization of trioxane with cyclic ethers, acetals, esters and anhydrides, which has already been proposed, can also be initiated by traces of the organic perchloric acid compounds according to the invention.

It is also possible to polymerize trioxane with the initiators according to the invention with the addition of polymerization transfer agents, such as acyclic ethers, acetals, esters and anhydrides. The polyoxymethylenes produced thereby have excellent thermal stability.

An additional stabilization of the polyoxymethylenes obtained according to the invention against autoxidation with known antioxidants, such as phenyl-β-naphthyl amine, is of advantage.

The polyoxymethylenes produced according to the invention can be used to form shaped bodies employing procedures normally used for thermoplastics, such as injection molding, pressure molding or rolling. They also can be used to coat objects. If desired, the process according to the invention can also be carried out in the presence of such materials which improve the stability, mechanical properties or processing of the shaped bodies produced therefrom. Such additional materials include such plasticizers and stabilizers which do not influence the progress of the polymerization.

In this way, shaped bodies are obtained which are tough and elastic, which are not decomposed by alkalies and are quite stable against acids and which only slightly depolymerize upon heating to 180° C. for one hour.

Of course, fillers and/or pigments, such as glass fibers, mineral wool or advantageously highly dispersed active fillers, such as alkaline carbon black, oxides of metals or metalloids, for example, silicon dioxide, aluminum oxide, zirconium oxide or titanium oxide produced by conversion of a volatile compound of such metal or metalloids at high temperatures in an oxidizing or hydrolyzing medium, may be added to the polyoxymethylenes produced according to the invention.

The following examples will serve to illustrate the process according to the invention.

*Example 1*

100 g. of anhydrous toluene were saturated with dry 1,3,5-trioxane at room temperature and 0.5 mg. of tertiary butyl perchlorate dissolved in toluene was added thereto. The mixture was heated to 40° C. whereby precipitation of polyoxymethylene already became noticeable. After 40 minutes the polymerization was terminated by the addition of 20 cc. of absolute alcohol and the resulting polymer filtered off and washed with methanol, warm soda solution and acetone and then dried. The yield was 12 g. The polymer melts at about 180° C. to a clear colorless liquid which very slowly decomposes to monomeric formaldehyde.

*Example 2*

An anhydrous solution of 26 g. of trioxane in 50 cc. of nitrobenzene was prepared and 0.044 mg. of acetyl perchlorate in the form of a dilute solution in nitrobenzene added thereto with an injection syringe. The mixture was permitted to stand with exclusion of air moisture for 40 hours at room temperature. The polymerization was then terminated by the addition of 10 cc. of anhydrous methanol and the polymer filtered off. After washing with ether and aqueous bicarbonate solution to remove the solvent and initiator residues, 13 g. of a white, odorless finely powdered polyoxymethylene were obtained. Upon melting such powder under nitrogen without further stabilization, it was found that the thermal decomposition velocity was 0.6% by weight per minute at 180° C.

*Example 3*

19.4 g. of trioxane, 50 cc. of nitrobenzene, 2.2 g. of γ-butyrolactone and 0.88 mg. acetyl perchlorate were mixed in the order indicated at 35° C. The polymerization started immediately and was terminated after 45 minutes by addition of anhydrous methanol and filtering off the polymer. 3.5 g. of polymer were recovered, half of which consisted of a copolymer of polyoxymethylene and γ-butyrolactone of excellent thermal stabiilty. This stable portion of the polymeric product only lost less than 0.1% by weight per hour upon heating at 190° C. under nitrogen. The melting point of the copolymer is 151–153° C.

*Example 4*

30 g. of neutral p-formaldehyde were decomposed thermally and the resulting gases absorbed in 100 cc. of absolute toluene at −50° C. 10 mg. of tertiary butyl perchlorate (also as a solution in toluene) were added dropwise to such solution while stirring. Polymerization started immediately and was terminated after 50 minutes by the addition of 10 cc. of absolute methanol. After filtering, washing and drying, 10 g. of polyoxymethylene were obtained.

*Example 5*

26 g. of pure anhydrous trioxane were dissolved in 90 g. anhydrous nitrobenzene. 2.2 mg. of benzoyl perchlorate, dissolved in 0.5 cc. nitrobenzene, were added with stirring. Polymerization at 20° C. starts immediately. After 4 min. 40% conversion are reached. After 60 min. the conversion is almost quantitative. The polymer was recovered as described in Example 2.

*Example 6*

23 g. of pure anhydrous trioxane and 19 g. of pure anhydrous 1,3-dioxolane were dissolved in 90 g. of absolute nitrobenzene. The copolymerization of trioxane with dioxolane was initiated by the addition 1.5 mg. acetyl perchlorate, dissolved in 0.5 cc. nitrobenzene. After 24 hours at 35° C. the copolymerization was terminated and the product isolated as described in Example 2. The yield was 22 g. of a white crystalline copolymer, which mainly consisted of oxymethylene units. Upon heating to 190° C. in a nitrogen atmosphere the weight of the polymer decreased only by 10% during 10 hours.

Further suitable alcoholic compounds as components of the perchloric acid esters which are applicable for the process of the invention are the following alcohols: Isopropyl-, sec.butyl-, tert.-butyl-, cyclohexyl-, benzyl-, diphenylmethyl-, 2-phenylisopropyl alcohol, cyclohexanediol, butanediol, polymeric alcohols as polyvinylalcohol and polyallylalcohol. For preparing the ester initiators it is of advantage to employ the alcohols in the form of their halogenides and reacting them with salts of the perchloric acid, especially with silver perchlorate.

Among the numerous organic acids especially aliphatic acids are suitable but laso aromatic acids may be used, e.g. acetic-, propionic-, caproic-, benzoic-, phenylacetic-, malonic, succinic-, adipic-, phthalic-, terephthalic-, polyacrylic acid.

The acids are preferably used as acyl halogenides in the reaction with a perchloric acid salt to form the mixed anhydrides.

We claim:

1. A process for the production of polyoxymethylenes which comprises polymerizing an essentially water free formaldehyde compound selected from the group consisting of monomeric formaldehyde and trioxane in contact with a catalytic amount of an initiator selected from the group consisting of (1) organic esters of perchloric acid and (2) mixed anhydrides of perchloric acid and an organic carboxylic acid, said perchloric acid and said organic carboxylic acid being the acid components of said mixed anhydrides.

2. The process of claim 1 in which the quantity of said initiator is between 1 and 1000 mg. per kg. of formaldehyde compound employed.

3. The process of claim 1 in which said polymerization is carried out at a temperature between 0° and 100° C.

4. The process of claim 1 in which said polymerization is carried out in an inert water free organic solvent.

5. The process of claim 1 in which the formaldehyde compound polymerized is trioxane.

References Cited in the file of this patent

UNITED STATES PATENTS

| | | |
|---|---|---|
| 2,985,625 | Schweitzer et al. | May 23, 1961 |
| 2,989,507 | Hudgin et al. | June 20, 1961 |
| 3,017,389 | Langsdorf et al. | Jan. 16, 1962 |